(12) United States Patent
Kim et al.

(10) Patent No.: US 9,197,437 B2
(45) Date of Patent: Nov. 24, 2015

(54) HOME APPLIANCE, HOME APPLIANCE DIAGNOSTIC SYSTEM, AND METHOD

(75) Inventors: Hyunsang Kim, Seoul (KR); Deoghyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 462 days.

(21) Appl. No.: 13/562,704

(22) Filed: Jul. 31, 2012

(65) Prior Publication Data

US 2013/0060359 A1  Mar. 7, 2013

(30) Foreign Application Priority Data

Aug. 2, 2011 (KR) ........................ 10-2011-0077078

(51) Int. Cl.

| | |
|---|---|
| *G06F 17/00* | (2006.01) |
| *G06F 11/30* | (2006.01) |
| *G06Q 30/00* | (2012.01) |
| *G06Q 10/00* | (2012.01) |
| *G08B 21/00* | (2006.01) |
| *G06F 3/00* | (2006.01) |
| *H04L 12/28* | (2006.01) |
| *H04L 12/26* | (2006.01) |

(52) U.S. Cl.
CPC ........ *H04L 12/2829* (2013.01); *H04L 12/2825* (2013.01); *H04L 43/50* (2013.01); *H04L 2012/285* (2013.01)

(58) Field of Classification Search
CPC ..... H04L 12/2829; H04L 43/50; G06F 17/00; G06Q 50/10; G06Q 30/00; F25D 29/00
USPC ......... 8/137; 62/125; 340/618, 603, 679, 540; 379/106; 455/423; 700/90; 702/183, 702/184, 185; 705/26, 305; 706/54; 714/37, 714/46; 715/8, 708
See application file for complete search history.

(56) References Cited

U.S. PATENT DOCUMENTS

| | | |
|---|---|---|
| 3,910,322 A | 10/1975 | Hardesty et al. |
| 4,146,754 A | 3/1979 | Rose |
| 4,766,505 A | 8/1988 | Nakano et al. |
| 4,797,656 A | 1/1989 | Keppler |
| 4,897,659 A | 1/1990 | Mellon |
| 4,897,857 A | 1/1990 | Wakatsuki et al. |
| 4,916,439 A | 4/1990 | Estes et al. |

(Continued)

FOREIGN PATENT DOCUMENTS

| | | |
|---|---|---|
| CN | 1212304 | 3/1999 |
| CN | 1343862 | 4/2002 |

(Continued)

OTHER PUBLICATIONS

European Search Report dated Dec. 17, 2012.

(Continued)

*Primary Examiner* — Mohammad Ali
*Assistant Examiner* — Md Azad
(74) *Attorney, Agent, or Firm* — Ked & Associates, LLP

(57) ABSTRACT

A home appliance, a home appliance diagnostic system, and an operation method are provided, which allow a user to easily perform smart diagnosis by image progress and simply operate an input device and to diagnose a status of a home appliance, by displaying setup of smart diagnosis in a menu image including characters and images and outputting explanation of progresses on a screen by stages in accordance with a set diagnosis method.

15 Claims, 11 Drawing Sheets

(56) References Cited

U.S. PATENT DOCUMENTS

| | | | |
|---|---|---|---|
| 4,977,394 A | 12/1990 | Manson et al. | |
| 5,103,214 A | 4/1992 | Curran et al. | |
| 5,210,784 A | 5/1993 | Wang et al. | |
| 5,268,666 A | 12/1993 | Michel et al. | |
| 5,452,344 A | 9/1995 | Larson | |
| 5,506,892 A | 4/1996 | Kojima et al. | |
| 5,586,174 A | 12/1996 | Bogner et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,864,828 A | 1/1999 | Atkins | |
| 5,939,992 A | 8/1999 | Devries et al. | |
| 5,940,915 A | 8/1999 | Nam | |
| 5,987,105 A | 11/1999 | Jenkins et al. | |
| 6,121,593 A | 9/2000 | Mansbery et al. | |
| 6,157,313 A | 12/2000 | Emmermann | |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 | 7/2004 | Watanabe et al. | |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 | 11/2006 | Lee | |
| 7,174,264 B2 | 2/2007 | Yasukawa et al. | |
| 7,243,174 B2 | 7/2007 | Sheahan et al. | |
| 7,266,164 B2 | 9/2007 | Jeon et al. | |
| 7,280,643 B2 | 10/2007 | Howard et al. | |
| 7,337,457 B2 | 2/2008 | Pack et al. | |
| 7,363,031 B1 | 4/2008 | Aisa | |
| 7,383,644 B2 | 6/2008 | Lyu et al. | |
| 7,439,439 B2 | 10/2008 | Hayes et al. | |
| 7,509,824 B2 | 3/2009 | Park et al. | |
| 7,558,700 B2 * | 7/2009 | Yamashita et al. | 702/183 |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | |
| 7,750,227 B2 | 7/2010 | Hayes et al. | |
| 7,843,819 B1 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,391,255 B2 | 3/2013 | Ribiere et al. | |
| 8,428,910 B2 | 4/2013 | Papadimitriou et al. | |
| 2002/0029575 A1 | 3/2002 | Okamoto | |
| 2002/0032491 A1 | 3/2002 | Imamura et al. | |
| 2002/0078742 A1 | 6/2002 | Kim | |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0028345 A1 | 2/2003 | Watkins et al. | |
| 2003/0058101 A1 | 3/2003 | Watanabe et al. | |
| 2003/0110363 A1 | 6/2003 | Bachot et al. | |
| 2003/0128850 A1 | 7/2003 | Kimura et al. | |
| 2003/0144010 A1 | 7/2003 | Dollinger | |
| 2003/0167782 A1 | 9/2003 | Roh et al. | |
| 2003/0196492 A1 | 10/2003 | Remboski et al. | |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0086979 A1 | 4/2005 | Son et al. | |
| 2005/0129200 A1 | 6/2005 | Forrest et al. | |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0113595 A1 | 5/2007 | Harwood et al. | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0272286 A1 | 11/2007 | Curtius et al. | |
| 2008/0036619 A1 | 2/2008 | Rhodes et al. | |
| 2008/0072383 A1 | 3/2008 | Bextermoller et al. | |
| 2008/0122648 A1 | 5/2008 | Ebrom et al. | |
| 2008/0181058 A1 | 7/2008 | Hayakawa | |
| 2009/0036778 A1 | 2/2009 | Cohen et al. | |
| 2009/0067102 A1 | 3/2009 | Cline et al. | |
| 2009/0160637 A1 | 6/2009 | Maeng | |
| 2009/0169434 A1 | 7/2009 | Ogusu | |
| 2009/0282308 A1 | 11/2009 | Gutsche et al. | |
| 2009/0323914 A1 * | 12/2009 | Lee et al. | 379/106.01 |
| 2010/0023938 A1 * | 1/2010 | Lee et al. | 717/171 |
| 2010/0027770 A1 * | 2/2010 | Park et al. | 379/106.01 |
| 2010/0037401 A1 | 2/2010 | Bae et al. | |
| 2010/0116060 A1 | 5/2010 | Murayama | |
| 2010/0318324 A1 | 12/2010 | Kim et al. | |
| 2011/0022358 A1 | 1/2011 | Han et al. | |
| 2011/0054845 A1 * | 3/2011 | Han et al. | 702/185 |
| 2011/0060553 A1 | 3/2011 | Han et al. | |
| 2011/0074589 A1 | 3/2011 | Han et al. | |
| 2011/0200189 A1 | 8/2011 | True et al. | |

FOREIGN PATENT DOCUMENTS

| | | |
|---|---|---|
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017520 | 4/2011 |
| EP | 0 038 687 | 10/1981 |
| EP | 0 510 519 | 10/1992 |
| EP | 0 617 557 | 9/1994 |
| EP | 0 691 060 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 04-358497 | 12/1992 |
| JP | 4-358497 | 12/1992 |
| JP | 07-239176 | 9/1995 |
| JP | 10-133767 | 5/1998 |
| JP | 11-127254 | 5/1999 |
| JP | 11-127254 | 11/1999 |
| JP | 2001-345949 | 4/2001 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 | 2/2002 |
| JP | 2002-85887 | 3/2002 |
| JP | 2002-162149 | 6/2002 |
| JP | 2002-279091 | 9/2002 |
| JP | 2003-172578 | 6/2003 |

(56) References Cited

FOREIGN PATENT DOCUMENTS

| | | |
|---|---|---|
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 | 12/1991 |
| KR | 10-1996-0003308 | 1/1996 |
| KR | 10-1997-0019443 | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 | 4/2000 |
| KR | 10-2001-0063913 | 5/2001 |
| KR | 10-2001-0055394 | 7/2001 |
| KR | 10-2002-0020831 | 3/2002 |
| KR | 10-2002-0030426 | 4/2002 |
| KR | 10-2002-0039959 | 5/2002 |
| KR | 10-2003-0000189 | 1/2003 |
| KR | 10-2004-00950767 | 6/2004 |
| KR | 10-2004-0103352 | 10/2004 |
| KR | 10-2004-0095017 | 11/2004 |
| KR | 10-2005-0062747 | 6/2005 |
| KR | 10-2005-0097282 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2001/050669 A1 | 7/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

European Search Report dated Jan. 2, 2013.
Ethem M Sözer; "Simulation and Rapid Prototyping Environment for Underwater Acoustic Communications: Reconfigurable Modem"; OCEANS-Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in Application No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Chinese Office Action dated Jun. 27, 2013.
U.S. Office Action issued in U.S. Appl. No. 12/431,893 dated Jul. 30, 2013.

(56) References Cited

OTHER PUBLICATIONS

U.S. Office Action issued in U.S. Appl. No. 12/757,339 dated Sep. 6, 2013.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Korean Office Action dated Aug. 13, 2012.
Japanese Office Action dated Sep. 11, 2012.
Notice of Allowance issued in Application No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
Korean Notice of Allowance dated Aug. 30, 2013.
U.S. Office Action issued in U.S. Appl. No. 12/842,649 dated Oct. 8, 2013.
Chinese Office Action dated Oct. 10, 2013. (416610).
Chinese Office Action dated Oct. 10, 2013. (419110).
U.S. Notice of Allowance issued in U.S. Appl. No. 12/846,013 dated Nov. 5, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
U.S. Office Action issued in U.S. Appl. No. 12/842,649 dated Aug. 15, 2014.
U.S. Notice of Allowance issued in U.S. Appl. No. 13/382,334 dated Nov. 12, 2014.
Chinese Office Action dated Oct. 30, 2014.
Japanese Office Action dated Nov. 18, 2014.
Chinese Office Action dated Dec. 3, 2014,.
U.S. Notice of Allowance issued in U.S. Appl. No. 13/922,669 dated Dec. 31, 2014.
Australian Office Action dated Sep. 22, 2014.
Chinese Office Action dated Oct. 8, 2014.
U.S. Notice of Allowance issued in U.S. Appl. No. 12/842,649 dated Dec. 10, 2014.
Russian Office Action issued in Application No. 2013130254 dated Jan. 23, 2015.
U.S. Office Action issued in U.S. Appl. No. 13/588,164 dated Apr. 3, 2015.

* cited by examiner

HOME APPLIANCE, HOME APPLIANCE DIAGNOSTIC SYSTEM, AND METHOD

CROSS-REFERENCE TO RELATED APPLICATION

This application claims the priority benefit of Korean Patent Application No. 10-2011-0077078, filed on Aug. 2, 2011 at the Korean Intellectual Property Office, the disclosure of which is incorporated herein by reference.

BACKGROUND OF THE INVENTION

1. Field of the Invention

The present invention relates to a home appliance, a home appliance diagnostic system, and a method.

2. Description of the Related Art

When a fault or error occurs during operation of a home appliance, the user generally calls an after-sales service center, explains the problem with the home appliance, and asks for a solution to the problem. However, it is not easy for the user to accurately recognize the state of the home appliance and explain that state to the after-sales service center, and so the user has difficulty solving the problem.

In particular, it frequently occurs that a repairer unnecessarily visits the user's home when an abnormal symptom of a home appliance is not due to a breakdown of the home appliance, but actually due to mishandling by the user.

Therefore, the user may solve the abnormal symptom by himself/herself, if the symptom of the home appliance is accurately found out so that a solution for the symptom may be provided.

SUMMARY

The present disclosure has been made in an effort to provide a home appliance, a home appliance diagnostic system, and a method which can, for example, more accurately analyze the status of a home appliance through the user's terminal.

Further, the present disclosure has been made in an effort to allow a user to more easily perform smart diagnosis and to diagnose the status of a home appliance by outputting explanations of diagnosis processes on a screen in stages in accordance with the diagnostic device selected at the home appliance.

Aspects of an invention are defined in the appended independent claims.

A home appliance, a home appliance diagnostic system, and an operation method according to the present disclosure allow diagnosing the status of a home appliance by connection with a terminal and/or a service center, by outputting product information as a sound signal, so that a user can simply identify an abnormal symptom and take appropriate measures, and accordingly, the user can more easily manage and repair the home appliance.

Further, the present disclosure allows, for example, a user to easily perform smart diagnosis by displaying the method of smart diagnosis and help in stages. Further, it is possible to easily perform smart diagnosis by simple operation.

Further, when an abnormal symptom is generated by a mistake or simple mis-handling by a user, the device in accordance with the present disclosure allows a user to recognize that the abnormal symptom is not generated by a defect of the product, so that it is possible to maintain the operational stability of the home appliance.

Advantageously, a user may select whether to perform diagnosis locally on a terminal or mobile communications device, such as a smartphone running a smart diagnostic "app" or application, and/or remotely by communicating with a call center over a communications link such as a telephone line, for example. Accordingly, an improved system is provided in which a control unit outputs user guides in stages depending on the chosen diagnostic method/device. It can be understood that a user may prefer to run a quick diagnosis at their convenience on their smartphone. For example, a call center may only be available at certain times of the day or may be busy with other customers. However, it can also be understood that a central call center can be continually updated with data from a large number of users such that better diagnosis may be provided. The inventors have recognized that advantageously a user may wish to select local and/or remote diagnosis.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the present disclosure. In the drawings.

DETAILED DESCRIPTION OF EMBODIMENTS

Figure 1:
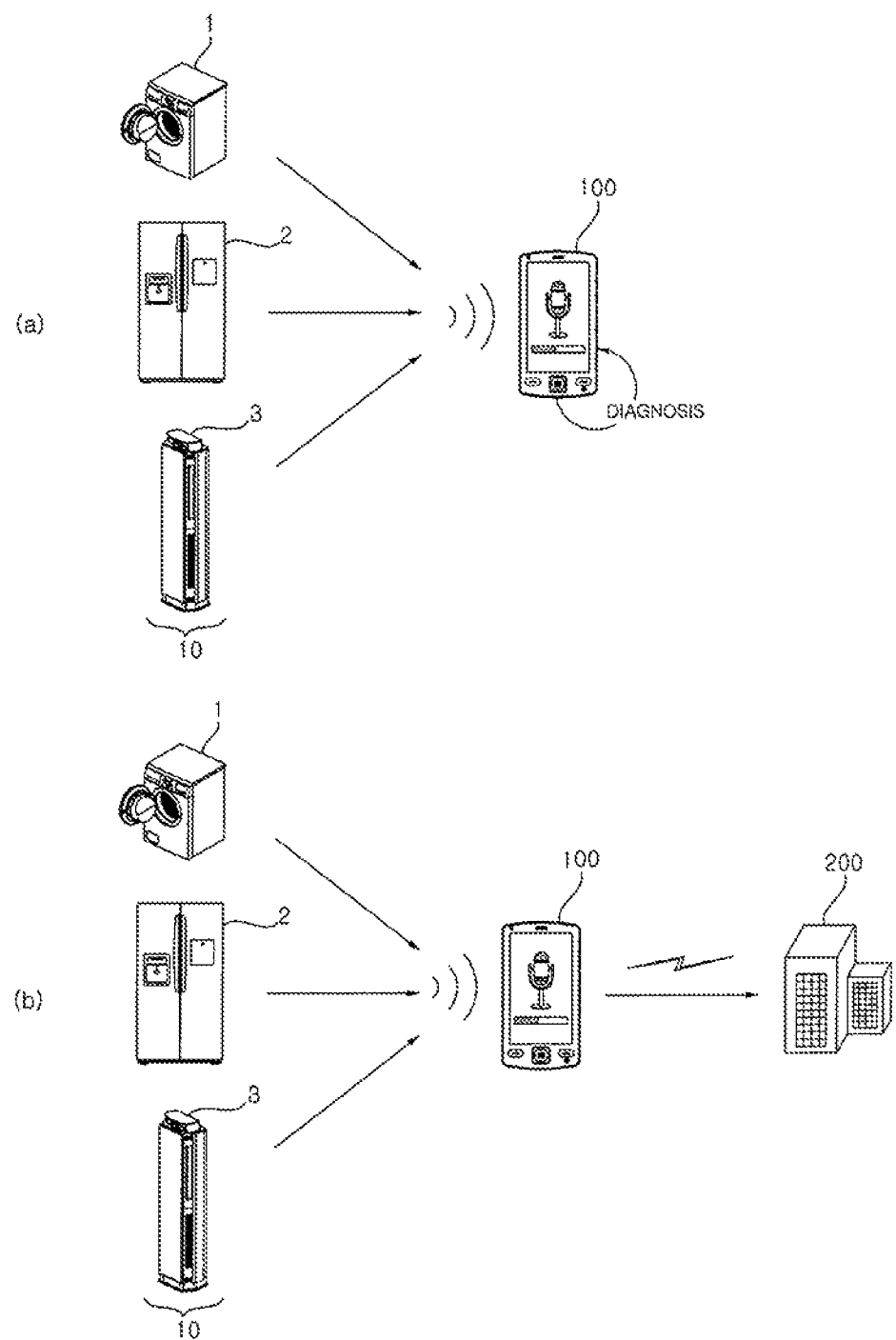
FIG. 1 is a diagram showing the configuration of a home appliance diagnostic system according to an exemplary embodiment.

The advantages and features of the device, method and system in accordance with the present disclosure, and methods of achieving them will be clear by referring to the embodiments that will be describe hereafter in detail with reference to the accompanying drawings. However, the present disclosure is not limited to the exemplary embodiments described hereafter and may be implemented in various ways. The invention is not restricted to the described embodiments but extends to the full scope of the appended claims.

Like reference numerals indicate like components throughout the specification.

FIG. 1 is a diagram showing the configuration of a home appliance diagnostic system according to an exemplary embodiment of the present disclosure.

Referring to FIG. 1(*a*), a home appliance diagnostic system includes a home appliance, 10, such as a laundry machine 1, a refrigerator 2, or an air conditioner 3, and as terminal 100 that receives signal sound including product information outputted from the home appliance 10 and diagnoses the status of the home appliance 10 and whether there is a breakdown.

Further, the home appliance diagnostic system, as shown in FIG. 1(*b*) further includes a service center 200 as a diagnostic device which provides the terminal 100 with diagnosis data for diagnosis of a home appliance and receives and stores the diagnosis results.

The terminal 100 can additionally receive diagnosis data from a diagnostic server of the service center or transmit the diagnosis result of the home appliance to the diagnostic server. Further, the terminal may request diagnosis by transmitting signal sound to the service center, when it is difficult to create a diagnosis result for the home appliance.

The service center 200 can provide a lot of diagnosis data to the terminal 100, so that the terminal can accurately and precisely diagnose a home appliance, using the provided data, and the diagnosis results of home appliances of users can be accumulated in the service center 200, and accordingly, it is possible to enlarge database for diagnosis of home appliances.

The service center 200 can precisely diagnose the status of a home appliance, when a problem that cannot be locally diagnosed by the terminal 100 is generated in the home appliance. Further, it is possible to diagnose a home appliance by receiving a signal sound including product information, in response to a request from the user of the home appliance.

The terminal 100 may be a mobile terminal such as a PDA (Personal Digital Assistant) or a mobile phone. However, recently, a smartphone developed by combining the functions of a mobile communication terminal and the functions of a PDA is spotlighted, and the smartphone is equipped with a large-capacity memory and a high-performance CPU in comparison to the existing mobile communication terminals and is provided with an operation system (OS) for executing various applications and supporting voice/data communication and cooperation with a PC. Optionally, the terminal 100 is a smartphone in the following description.

The home appliance is equipped with a sound output unit that outputs sound, such as a speaker or a buzzer, and regenerates and outputs the information on the operation, status, and breakdown of the home appliance with predetermined sound.

The home appliance stores product information for each step of performing the set operations. The product information may include operation information showing the operation status that is being performed now, breakdown information when a breakdown occurs, and setup information set by the user. In embodiments, the "product information" may be considered a "data package" comprising a plurality of information about the device and its current status (e.g. sensed data).

For example, when the home appliance generates a fault or a problem during operation, the home appliance stores product information including the operation information, the breakdown information, and the setup information. Therefore, even if the home appliance is suddenly stopped by a power failure or the like, the product information on the steps that have been performed, in the steps of operations has been stored, so that it is possible to determine by which point of time the operations that have been performed and which steps have not been performed until the operation finishes, using the information.

The user starts output of the sound including the product information by operation a selecting unit of the home appliance after putting the terminal 100 close to where sound is made in the home appliance, that is, close to the sound output unit. Therefore, the sound including the product information, and outputted as described above, is inputted to the terminal 100.

The terminal 100 in turn extracts the product information from the received sound and diagnoses the status of the home appliance and whether there is a breakdown from the product information. The diagnosis process for a home appliance which is made by the terminal 100 will be described in more detail below.

Figure 2:
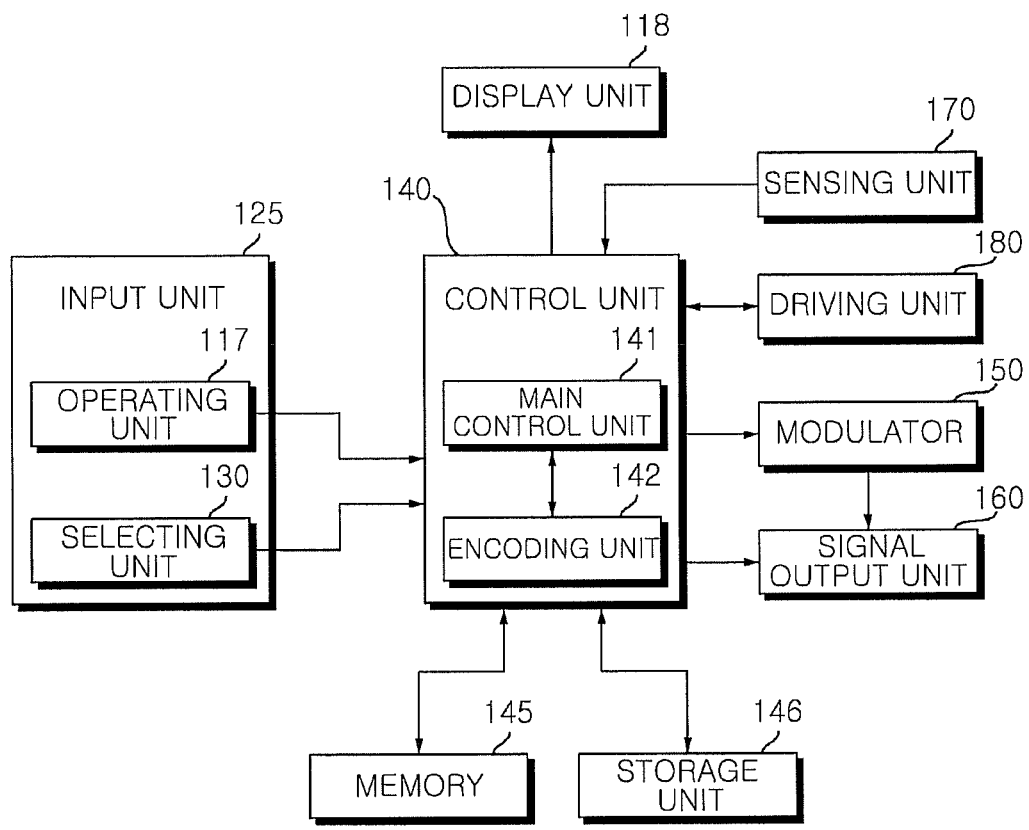
FIG. 2 is a block diagram showing the main configuration of the home appliance of FIG. 1.

FIG. 2 is a block diagram showing the main configuration of the home appliance of FIG. 1.

A laundry machine is exemplified as a home appliance in the following description. Referring to FIG. 2, a home appliance 10 includes a control configuration that performs washing, rinsing-out, and dehydrating on laundry, and creates a control signal in a predetermined format for the product information including data of the home appliance to be outputted by predetermined sound, when a smart diagnosis mode is set by an input from a selecting unit 130, by processing data generated during operation.

The home appliance 10 includes an input unit 125, a sensing unit 170, a memory 145, a storage unit 146, a driving unit 180, a modulator 150, and sound output unit 160, and a control unit 140 that controls all of operations of the home appliance.

The input unit 125 is provided with at least one input means that is operated by a user to input a predetermined signal or data to the home appliance 10, and includes an operating unit 117 and the selecting unit 130.

The selecting unit 130 includes at least one input means, and when entering the smart diagnosis mode, the selecting unit 130 transmits a signal output order to the control unit 140 such that the product information is outputted by predetermined sound through the sound output unit 160.

The selecting unit 130 may be configured by a specific input means separately from the operating unit 117, but it may be operated or recognized as a selecting unit as two or more operating units 117 are simultaneously operated, in some cases, and it may be operated or recognized as a selecting unit when a specific operating unit 117 is continuously operated or operated over a predetermined time.

Further, the selecting unit 140 turns on/off the sound output unit 160, as the smart diagnosis is entered. That is, when a signal output order is inputted by the selecting unit 130, a control signal including the product information is outputted by predetermined sound in response to a control order from the control unit 140, in which the sound output unit 160 is operated and outputs sound.

The operating unit 117 receives data such as an operation course or operation setup by the operation of the home appliance 10 and transmits the data to the control unit 140. Further, the operating unit 117 receives setup according to output of sound. That is, operating unit 117 inputs a setting value for setting the method of outputting sound and the volume of output sound.

The input unit 125 including the selecting unit 130 and the operating unit may be implemented by a button, a dome switch, a (static pressure/electrostatic) touch pad, a jog wheel, a jog switch, a finger mouse, a rotary switch, or a jog dial, and anything can be used as long as it generates predetermined input data by an operation such as pushing, turning, pressing, or contacting.

The sensing unit 170 includes at least one sensing means that senses temperature, pressure, voltage, current, water level, and the number of rotations and transmits the sensed or measured data to the control unit 140. For example, the sensing unit 170 measures the level of water when supplying or discharge water in a laundry machine, and measures the temperature of the supplied water and the rotational speed of the tub or the drum. The sensing unit includes at least one temperature sensing unit (not shown).

The driving unit 180 controls the driving of the home appliance such that the set operation is performed, in response to a control signal transmitted from the control unit 140. Accordingly, the laundry machine washes the laundry by performing a series of processes such as washing, rinsing-out, and dehydrating. The driving unit includes a motor control unit (not shown) that transmits an operation control signal to a motor.

For example, for a laundry machine, the driving unit 180 drives a motor that rotates the tub or the drum and controls the operation of the motor such that the tub or the drum washes the laundry by rotating. Further, valves are controlled to supply or discharge water in response to a control order from the control unit 140.

The memory 145 stores control data for controlling the operation of the home appliance 10 and reference data that is used in operation control of the home appliance.

The memory 145 includes all data storage means such as ROM or EEPROM where control data for the home appliance is stored. The storage unit 146 is a storage means that temporarily store data, as a buffer of the control unit 140, DRAM or SRAM may be used, and in some cases, the storage unit 146 is included in the control unit 140 or the memory 145.

The memory 145 stores, for example: operation status data generated when the home appliance 10 performs a predetermined operation; operation information such as setup data inputted by the operating unit 117 such that the home appliance 10 performs a predetermined operation; use information including the number of times of specific operations performed by the home appliance 10; model information of the home appliance 10; and breakdown information including the information on the cause of malfunction or the position of malfunction when the home appliance 10 generates malfunction.

When a signal is inputted from the selecting unit 130 in accordance with entering the smart diagnosis mode, the control unit 140 calls the product information stored in the memory 145 or the storage unit 146, creates a control signal in a predetermined format, and transmits the control signal to the modulator 150. Further, the control unit 140 controls the sound output unit 160 to operate, as the selecting unit 130 is operated.

The control unit 140 includes a main control unit 141 that controls the flow of data inputted/outputted to/from the home appliance, creates and transmits a control order in accordance with the data inputted from the sensing unit 170 or transmits the sensed data to the driving unit such that the home appliance operates, and an encoding unit 142 that converts the product information into a control signal having a predetermined format to output sound in accordance with an input from the selecting unit 130.

The main control unit 141 performs control of outputting start sound saying start of the smart diagnosis mode through the sound output unit 160 when the selecting unit 130 is operated and the smart diagnosis mode is entered, and performs control of displaying predetermined data saying that the smart diagnosis mode is performed, through the display unit 118.

Further, the main control unit 141 controls the sound output unit 160 such that a predetermined alarm is outputted before and after sound is outputted, when the control signal created from the encoding unit 142 is transmitted to the modulator 150 and the sound is outputted from the sound outputting unit 160. However, the alarm before the sound is outputted may be omitted.

When two or more sound output units 160 are provided, the main control unit 141 respectively controls the sound output units 160 to output an alarm and sound including the product information.

The main control unit 141 keeps the operating unit 117 stopped, except for the selecting unit 130 and a power key, when the smart diagnosis mode is entered, and controls the sensing unit 170 and the driving unit 180 such that the home appliance stops all other operations.

Further, when any one operating key according to operating setup of the home appliance in the operating unit 117 is operated after power is supplied, the main control unit 141 prevents the smart diagnosis mode from starting even if the selecting unit 130 is operated. In particular, when it is recognized that the selecting unit 130 is operated by a combination of two or more operating keys of a plurality of operating keys of the operating unit 117 without the selecting unit 130, the smart diagnosis mode is started only when the selecting unit 130 is operated by a combination of predetermined keys without an input after the power key is operated.

In this operation, the operation setup of the home appliance by the operating unit is set not to enter the smart diagnosis mode by considering the user has not intention to enter the smart diagnosis mode, and this is for preventing unnecessarily entering the smart diagnosis mode due to a mistake with operating the operating unit.

The encoding unit 142 calls the product information stored in the memory 145 and encodes the product information in a predetermined method, and creates a control signal in a predetermined format by adding a preamble and an error check bit to the data signal. The encoding unit 142 creates a control signal composed of a plurality of symbols by encoding the product information.

The encoding unit 142 encodes the product information by using an error coding method for restoring a bit error in order to cope with a problem of data loss that may be generated while the product information is outputted by sound and transmitted through a network. In an embodiment, the encoding unit uses an FEC (Forward Error Correction) encoding method although the skilled person will understand that other methods may be equally suitable. The encoding unit 142 encodes the product information, using a convolution code. The diagnostic server of the service center performs decoding, using a viterbi decoding algorithm, for the encoding method.

The encoding unit 142 is based or ½ code rate or ⅔ code rate method in which 2 bits are outputted for an input of 1 bit, in encoding described above. Further, the encoding unit 142 reduces the number of redundant bits, using a puncturing algorithm.

Further, the encoding unit 142 performs bit interleaving to cope with a burst error that may be generated while data is transmitted. The bit interleaving is performed by cutting the entire data in unit reference bit, and the bit interleaving is performed in a unit of 32 bits. That is, when there is data of 60 bytes, the orders are mixed in a unit of 4 bytes in accordance with a predetermined rule.

Further, the encoding unit 142 forms a packet composed of a plurality of frames by dividing a control signal into predetermined magnitudes to be framed, when creating the control signal. Further, the encoding unit 142 can set IFS for a predetermined time between the frames in the control signal, and can set a dead time in a symbol at a section where a data value changes, in order to remove a reverberation effect that influences conversion of the next signal due to the charging and discharging principle of a capacitor, when converting a signal.

In a plurality of symbols constituting the control signal, assuming that the length of each symbol is a symbol time and the basic length of a frequency signal constituting sound outputted through the sound output unit 160 in accordance with the symbol is also a symbol time, the encoding unit 142 can set a dead time within the symbol time for one symbol. The magnitude of the dead time depends on the length of the symbol time.

The product information includes, for example, at least on of product ID, configuration, operation information, and error-detecting information. The product information is data made of a combination of 0 and 1, and is a digital signal having a type that can be read out by the control unit 140.

The product ID is information for identifying the kind of an object to be diagnosed by the diagnostic server. The diagnostic server that is described below may be configured to diagnose various home appliances such as a washing machine, an air conditioner, and a cooker, in addition to a refrigerator, and the product ID may include the information on what the object to be diagnosed by the diagnostic server is.

The configuration is information inputted from the user to set a function of the home appliance. The operation information is the information on the operation status of the home appliance and includes time information, measurement information on temperature and pressure measured by sensors and operation information on whether to operate. Further, the error-detecting information is the information whether various components of the home appliance normally operate, including an error code.

The control unit 140 classifies the data of the product information, allows specific data to be included, divides or combines the data in predetermined sizes, and creates and transmits a control signal with a predetermined standard to the modulator 150.

Further, the control unit 140 can change the number of symbols corresponding to an output frequency signal, in accordance with the number of frequencies that are used in the modulator 150.

The modulator 150 transmits a predetermined driving signal to the sound output unit 160 such that sound is outputted through the sound output unit 160, in response to a control signal transmitted from the control unit 140. The output sound includes the product information.

The modulator 150 transmits a signal to the sound output unit 160 such that a frequency signal designated for one symbol is outputted for a symbol time, in the symbols constituting the control signal.

The modulator 150 performs control such that sound is outputted in response to a control signal by using a plurality of frequency bands, and changes and outputs the number of symbols per frequency signal, in accordance with the number of used frequencies, corresponding to the setup of the control unit 140. For example, when two kinds of frequencies are used, one frequency signal is outputted for one symbol, and when four kinds of frequencies are used, one frequency signal may be outputted for two symbols of a control signal.

The modulator 150 includes frequency generators (not shown) that generate an oscillation frequency for each frequency in accordance with the number of available frequencies and controls the sound output unit 160 to output the frequency signal of a designated frequency generator, in response to a control signal.

The modulator 150 converts a signal, using any one of a frequency deviation method, an amplitude shift method, and a phase shift method, when controlling the sound output unit 160 to output sound in response to the control signal of the control unit 140.

The frequency deviation method is a method of performing conversion into a signal with a predetermined frequency in accordance with a data value of a control signal and the amplitude shift method is a method of performing conversion such that the magnitude of an amplitude change in accordance with a data value. Further, the phase shift method is a method of converting a signal such that the phase changes in accordance with a data value.

Further, in the amplitude shift method, it is converted into a signal having a frequency of 2.6 KHz, and when the data value of the control signal is 0, it may be converted into a signal having the magnitude of the amplitude of 1 and a frequency of 2.6 KHz, and when the data value is 1, it may be converted into a signal having the magnitude of the amplitude of 2 and a frequency of 2.6 KHz.

In BFSK (Binary Frequency Shift Keying) in the frequency deviation method, when the data value of a control signal is 0, it is converted to have a first frequency, and when the data value is 1, it is converted to have a second frequency.

For example, when the data value is 0, it is converted into a signal having a frequency of 0.6 KHz, and when the data value is 1, it is converted into a signal having a frequency of 2.8 KHz. For example, in the signal of '010' shown in FIG. 4A, 0 (11) is converted into 2.6 KHz (21), 1 (12) is converted into 2.8 KHz (22), and 0 (13) is converted into 2.6 KHz (23).

Although it is exemplified that the modulator 150 uses the frequency deviation method, but this may be changed. Further, the used frequency band is only an example and may be changed.

When a dead time is set in a control signal, the modulator 150 stops converting a signal for the section where the dead time is set. The modulator 150 temporarily stops frequency signal conversion for the dead time by turning off the oscillation frequency for modulation, in the section where the dead time is set, when converting a signal by using pulse width modulation (PWM) method. Therefore, the reverberation effect between symbols are removed in the sound outputted through the sound output unit 160.

The operation of the sound output unit 160 is turned on/off by a control order of the control unit 140 and controlled by the control of the modulator 150 to output predetermined sound including the product information by outputting a signal having a predetermined frequency corresponding to a control signal for a predetermined time.

In this configuration, at least one sound output unit 160 may be provided. For example, when two sound output units are provided, sound including the product information may be outputted through any one and an alarm or effect sound corresponding to the status information of the home appliance may be outputted through the other one, and an alarm before the smart diagnosis mode is entered or sound is outputted.

The sound output unit 160 outputs a control signal by predetermined sound in accordance with an output from the modulator 150, and stops the operation when the outputting is finished, and when the selecting unit 130 is operated again, the sound output unit 160 operates again through the process described above and outputs predetermined sound including the product information.

The sound output unit 160 may be a means for outputting sound such as a speaker and a buzzer, but it is preferable to use a speaker having a wide regeneration band to use a plurality of frequency bands.

Further, the sound output unit 160 outputs start sound that saying that the smart diagnosis mode is started, in accordance with a control order from the main control unit 141, when the smart diagnosis modes is entered, and outputs predetermined alarms when outputting of sound including the product information is started and finished.

The display unit 118 displays the information inputted by the selecting unit 130 and the operating unit 117, the operation status information of the home appliance 10, and the information showing that the home appliance finishes operating, on the screen, in accordance with a control order from the main control unit 141. Further, when the home appliance generates malfunction, the display unit 118 displays the breakdown information on the malfunction on the screen.

Further, when the smart diagnosis mode is started in accordance with a control order from the main control unit 141, the display unit 118 displays that it is the smart diagnosis mode, and displays the process with at least one of characters, images, and numbers, when sound is outputted through the sound output unit 160.

The home appliance may further include an output means such as a lamp that is turned on/off or a vibrating element, in addition to the sound output unit 160 and the display unit 118.

Figure 3:
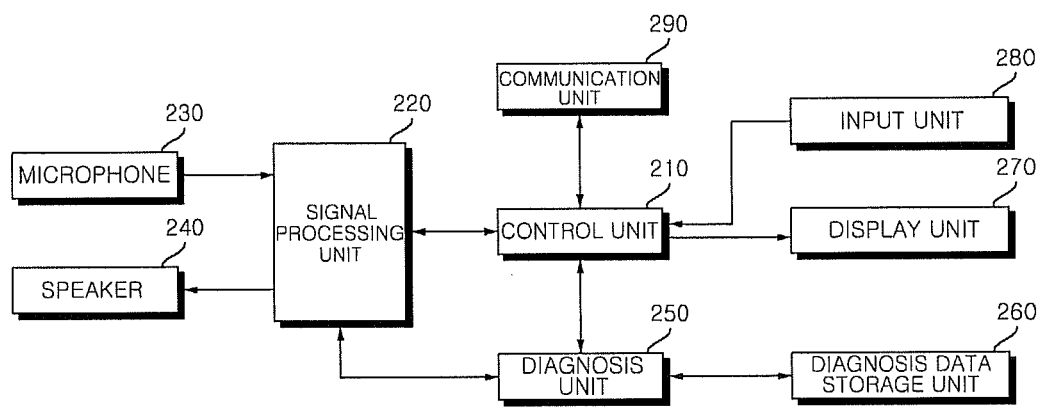
FIG. 3 is a block diagram showing the main configuration of a the terminal of FIG. 1.

FIG. 3 is a block diagram showing the main configuration of the terminal of FIG. 1. Referring to FIG. 3, the terminal 100 may include a control unit 210, a signal processing unit 220, a microphone 230, a speaker 240, a diagnosing unit 250, a diagnosis data storage unit 260, a display unit 270, an input unit 280, and a communication unit 290.

The microphone 230 receives sound including product information and outputted from a home appliance. For example, a microphone that is used for usual telephone conversation may be used.

The speaker 240 is provided to output various messages to the user when a home appliance is diagnosed. For example, a speaker that is used for usual telephone conversation may be used.

The signal processing unit 220 extracts the product information from the sound received by the speaker 240. The signal conversion performed in the signal processing unit 220 is inverse conversion of the signal conversion performed in the home appliance. The signal processing unit 220 may convert sound including product information which is an analog signal at a predetermined frequency band, into a digital signal, using any one of a frequency deviation method, an amplitude shift method, and a phase shift method.

Further, the signal processing unit 220 may extract a control signal in a unit of frame from the converted data, and then extract the product information by decoding the control signal. The signal processing unit 120 detects a preamble showing the start of a data including the product information, detects the control signal including the product information on the basis of the detected preamble, and decodes the control signal having a predetermined format in a decoding method corresponding to the method of encoding the product information of the home appliance, thereby extracting the product information of the home appliance included in the control signal.

The diagnosing unit 250 diagnoses the operation status of a home appliance and whether there is a breakdown by analyzing the product information transmitted from the signal processing unit 120. Home appliance diagnosis that analyzes product information, using a diagnosis application is performed in the diagnosing unit 250.

The diagnosis data storage unit 260 is a unit where the information on an error code of a home appliance, diagnosis data for diagnosing whether there is a breakdown and the cause of a breakdown, and data about a solution according to the cause of a breakdown are stored. The diagnosis data storage unit 260 may be implemented by various types of recording medium such as a hard disk, a flash memory, a ROM (Read Only Memory), and SSD (Solid State Driver).

The input unit 280 includes at least one input means that is operated by the user to input a predetermined signal or data to the control unit 110, and the input means may be implemented by a touch screen that performs an image display function and a command input function, button type/dial type operating keys, or a keyboard. The user can drive a diagnosis application through a specific input means of various input means provided to the input unit 280.

The display unit 270 displays a user interface display for each execution step of the diagnosis application. Various image displays using an LCD (Liquid Crystal Display) or an LED (Light Emitting Diode) may be exemplified.

Meanwhile, in the terminal 100 with the display unit 270 implemented by a touch screen, the touch screen may perform the functions of both the display unit 270 and the input unit 280, in which the selection area displayed for selection of various menus in the user interface screen may function as the input unit 280. Therefore, it should be understood that the display unit 170 and the input unit 280 described below may not necessarily mean discriminate physical devices, and the names of the other components are just classified in accordance with the functions and do not necessarily mean individual discriminate physical devices.

The communication unit 290 allows data to be transmitted between the terminal 100 and the service center 200. The communication unit may be implemented by a modem that connects the terminal 100 with a mobile communication network, a modem or a wireless LAN card that connects the terminal 100 with a wireless communication network such as Wi-Fi.

The control unit 210 controls various components in the terminal 100 while a home appliance is diagnosed, which is described below with the operations of the components that are controlled by the control unit 210.

The terminal includes an application for diagnosing a home appliance. The smart diagnosis application installed in the terminal is for diagnosing a home appliance and provides a smart diagnosis menu analyzing the operation status of a home appliance and showing a corresponding measure, an explanation that explains the use of the smart diagnosis application, a demo menu showing a preview of a smart diagnosis application, an introduction menus providing the information of user reviews and related website addresses.

When the smart diagnosis menu is selected, sound including product information and outputted from a home appliance is recorded and the home appliance is diagnosed by inversely extracting and analyzing the product information from the recorded signal sound, and then the diagnosis result may be outputted such that the user can recognize or a repairman of the service center 200 may be called through the communication network.

Figure 4:
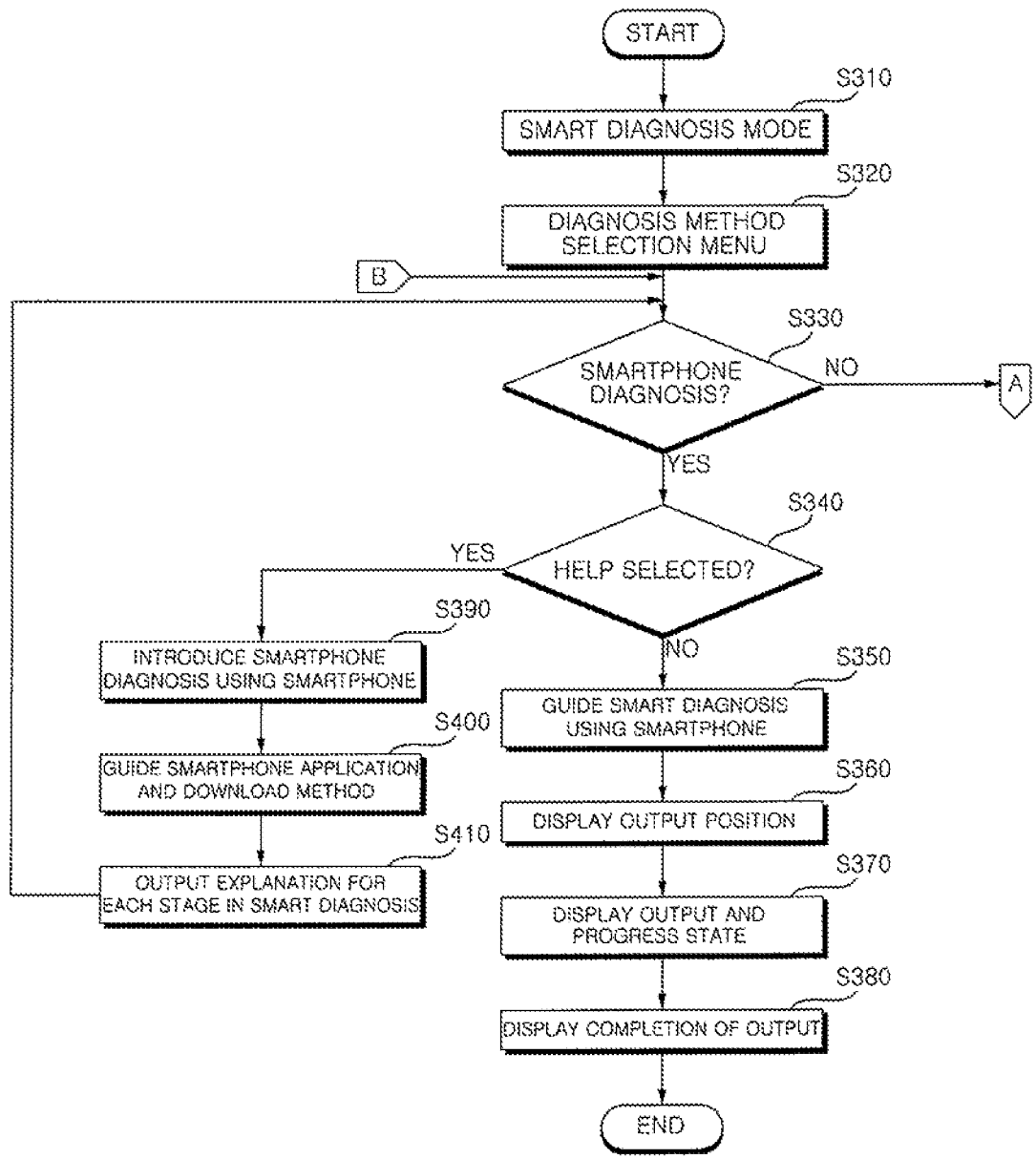
FIGS. 4 and 5 are flowcharts illustrating a method of setting a diagnosis mode of the home appliance of FIG. 2.
Figure 5:
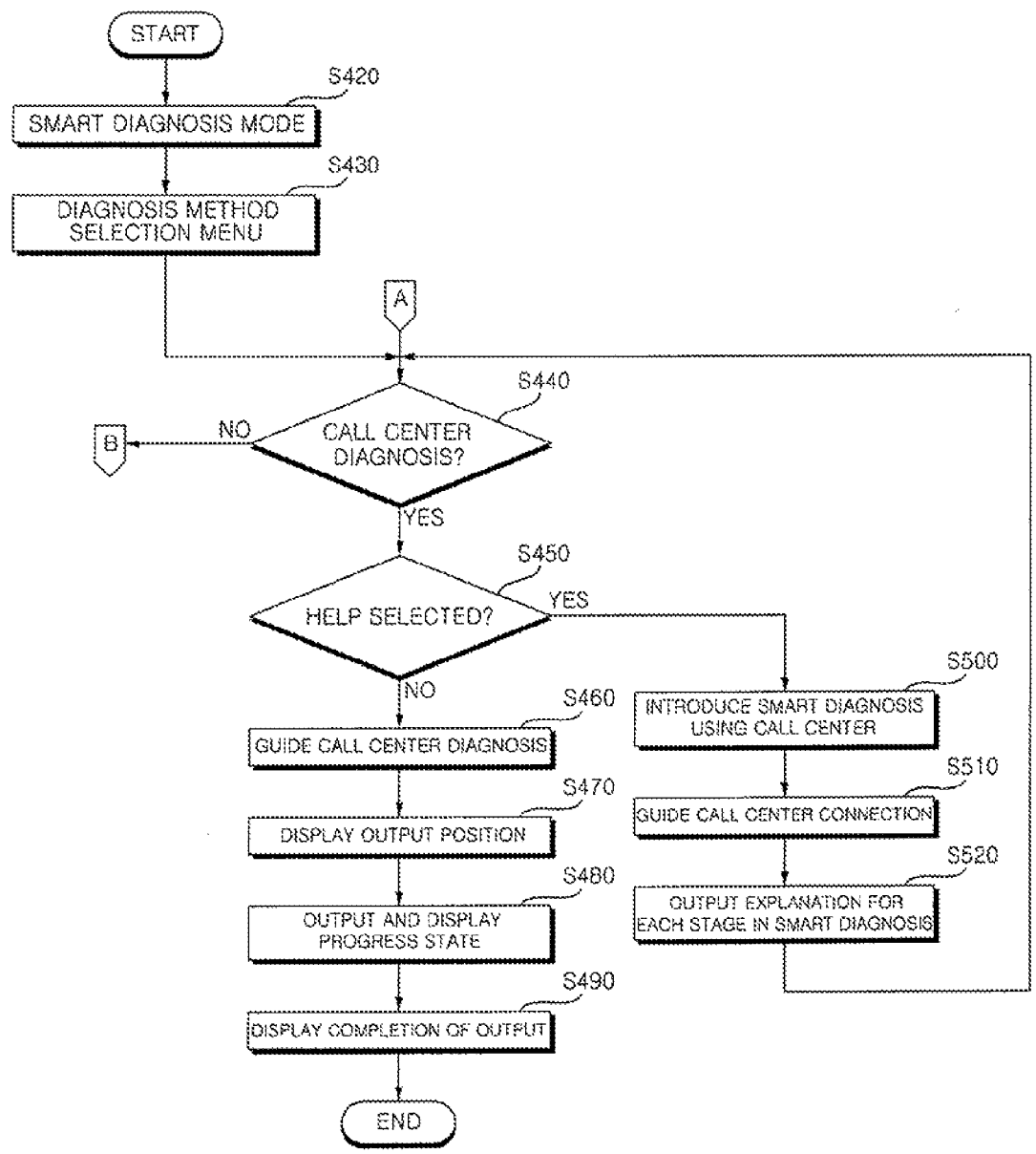

FIGS. 4 and 5 are flowcharts illustrating a method of setting a diagnosis mode of the home appliance of FIG. 2.

Referring to FIG. 4, when the smart diagnosis mode is selected from the menu image display on a home appliance and the display unit 118 (S310), a selection menu for selecting the diagnosis method according to the diagnostic device is displayed (S320).

Icons or buttons corresponding to smartphone diagnosis and call center (service center) diagnosis is displayed on the selection menu for the diagnosis method such that any one of the smartphone diagnosis and the call center diagnosis can be selected by a diagnostic device.

When the smartphone diagnosis is selected (S330), the process of the smartphone diagnosis is displayed on the display unit 118 (S350). Further, the position where signal sound including product information is outputted is displayed by an image on the display unit 118 (S360), and when signal sound starts to be outputted, the progress state according to the output signal sound is displayed (S370). When outputting signal sound is finished, a message saying completion of output is displayed on the screen of the display unit 118 (S380).

A help button or icon is displayed on the screen before the smartphone diagnosis is started after the smartphone diagnosis is selected. A help button of icon is displayed on the images in accordance with the progress state stages even after the smartphone diagnosis is selected.

When a help is selected (S340), introduction of the smart diagnosis by a smartphone is outputted on the screen (S390), and a guide and a download method of an application for diagnosing a home appliance with the smartphone are displayed (S400). In some cases, a link or a code, for example, a QR code (Quick Response Code) for direct connection with related applications may be displayed on the screen.

Further, explanations for each stage about using of the smartphone are outputted on the screen of the display unit 118 (S410).

Further, referring to FIG. 5, when the smart diagnosis mode is selected from the menu image display on a home appliance and the display unit 118 (S420), a selection menu for selecting the diagnosis method is displayed (S430).

When the call center diagnosis is selected (S440), a guide for the call center diagnosis is outputted on the screen of the display unit 118 of the home appliance (S460).

Further, the position where signal sound including product information is outputted from a home appliance is displayed by an image on the display unit 118 (S470), and when signal sound starts to be outputted, the progress state according to the output signal sound is displayed (S480). When outputting signal sound is finished, a message saying completion of output is displayed on the screen of the display unit 118 (490).

Meanwhile, even in the call center diagnosis, a help button or icon is displayed on the screen before the call center diagnosis is started. A help button of icon is displayed on the images in accordance with the progress state stages even after the call center diagnosis is selected.

When the help is selected (S450), introduction of the smart diagnosis by the call center is outputted on the screen (S500) and a guide about the method of connecting the call center is outputted (S510). In this process, the call center phone number, the call center service time, and the Internet address may be displayed.

Further, explanations for each stage about using of the call center are outputted on the screen of the display unit 118 (S520).

Figure 6:
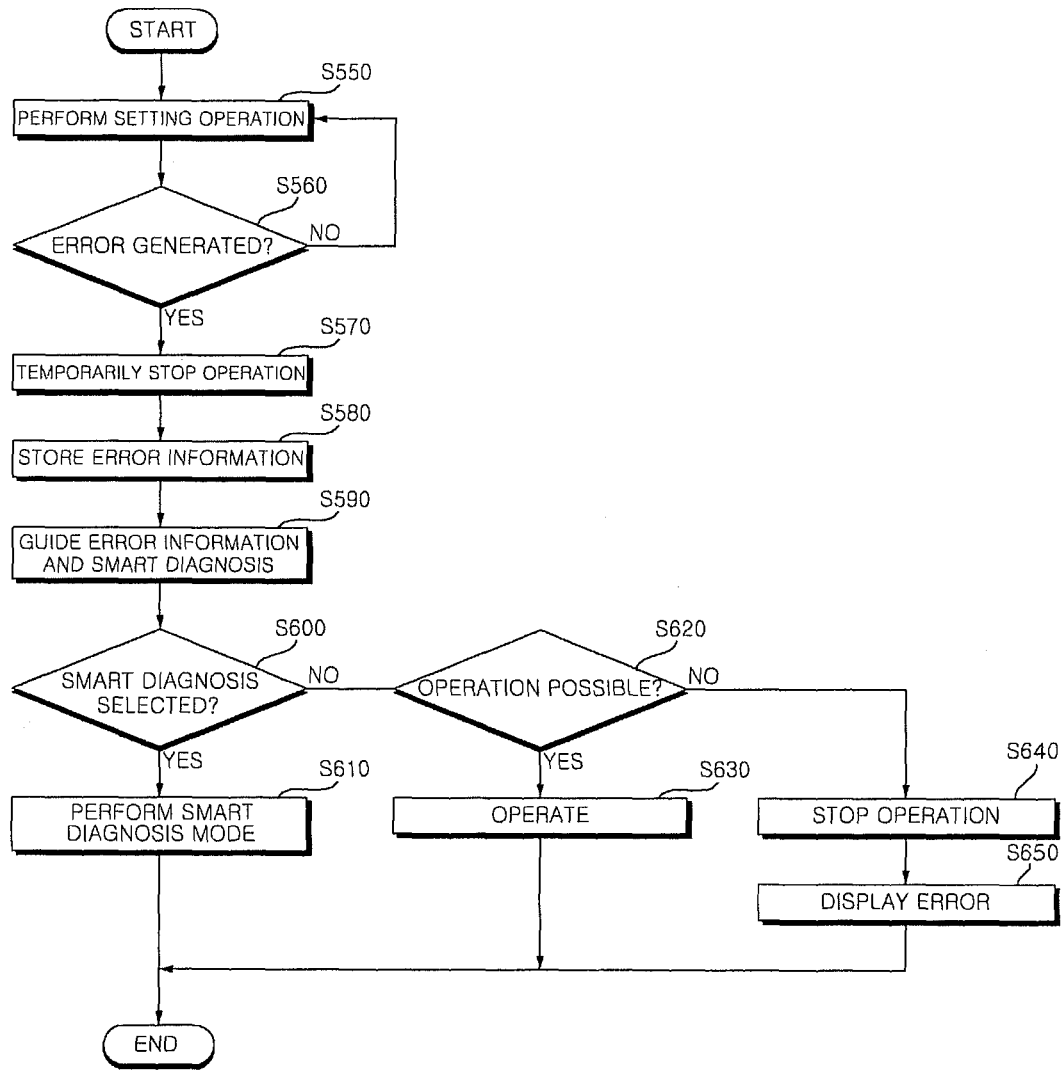
FIG. 6 is a flowchart illustrating a method of entering the diagnosis mode when an error is generated while a home appliance operates.

FIG. 6 is a flowchart illustrating a method of entering the diagnosis mode when an error is generated while a home appliance operates.

Referring to FIG. 6, a home appliance temporarily stops the operation (S570) when an error is generated while performing a set operation (S550).

The control unit 110 of the home appliance stores the information on the generated error (S580) and outputs a guide about the error information and the smart diagnosis on the display unit 118.

An icon or a button for setting the smart diagnosis is displayed on the screen of the display unit 118 where the guide about the smart diagnosis is outputted such that the smart diagnosis can be immediately set.

When the icon or the button for setting the smart diagnosis is selected and inputted (S600), the control unit stops all operations and executes the smart diagnosis mode (S610). In this case, the home appliance creates the product information, using the error information stored after the diagnosis method is selected and outputs the product information, using predetermined signal sound.

Meanwhile, when the smart diagnosis is not selected, the control unit 110 determines whether the operation is possible (S620).

When the operation can keep performed even though an error is generated, the operation that has been set before may be performed next, or a new operation may be performed after the existing setup is initialized (S610).

On the other hand, when it is determined that the operation is impossible, the control unit stops the operation (S640) and displays an error (S650).

FIGS. 7 to 12 are views showing various example of a user interface screen according to the setup of a diagnosis mode of a home appliance.

Figure 7:
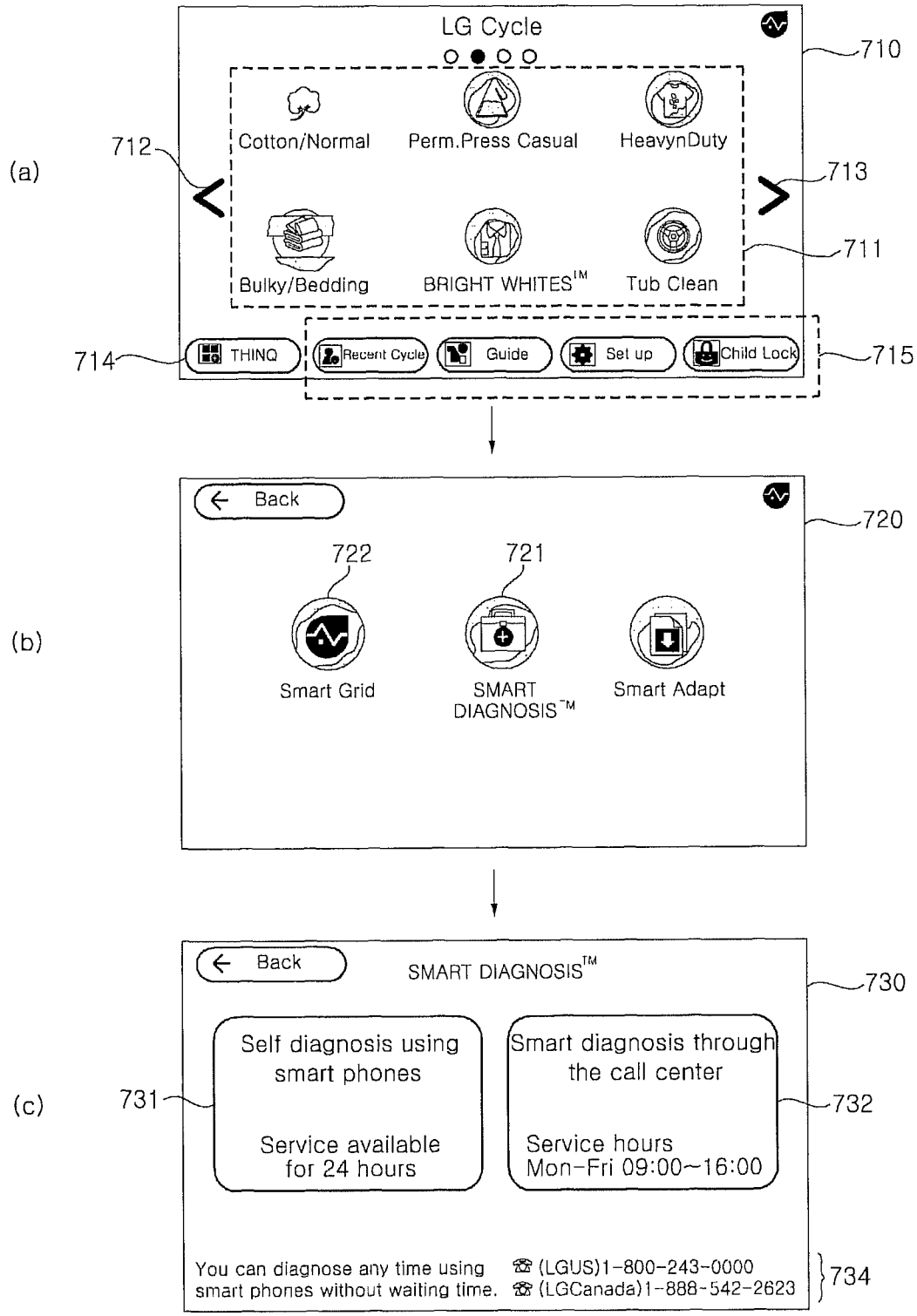
FIGS. 7 to 12 are views showing various example of a user interface screen according to the setup of a diagnosis mode of a home appliance.

FIG. 7 is a view showing an interface image for setting the smart diagnosis mode of a home appliance. As shown in FIG. 7(*a*), an operation menu image 710 for the operation mode and the operation setup is displayed on the display unit 118 of a home appliance.

A menu icon 711 for setting the material of laundry, the kind of laundry, and a washing mode is displayed and moving buttons 712 and 713 for switching to other menu items are displayed, in the operation menu image.

Further, a setup menu 715 and a special menu 711 for setting operations other than the basic operation of the home appliance are displayed. When the special menu is selected, as shown in FIG. 7(*b*), a mode setting image 720 for setting a specific mode related to the home appliance is displayed.

Menu icons for a smart grid mode 722 related with the power consumption, a smart diagnosis mode 721 for diagnosing the status of the home appliance, and a smart adapter mode for setting compatibility with other home appliances or other devices are displayed in the mode setup image.

When the smart diagnosis mode is selected, as shown in FIG. 7(*c*), a diagnosis method selection menu 730 for breakdown diagnosis of a home appliance is displayed. It is possible to select any one diagnostic device for the smart diagnosis 731 using the smartphone or the diagnosis 732 using the call center. Further, a telephone number for inquiry may also be displayed. The guides related to the diagnosis methods are also displayed, and for example, an available time is displayed.

Figure 8:
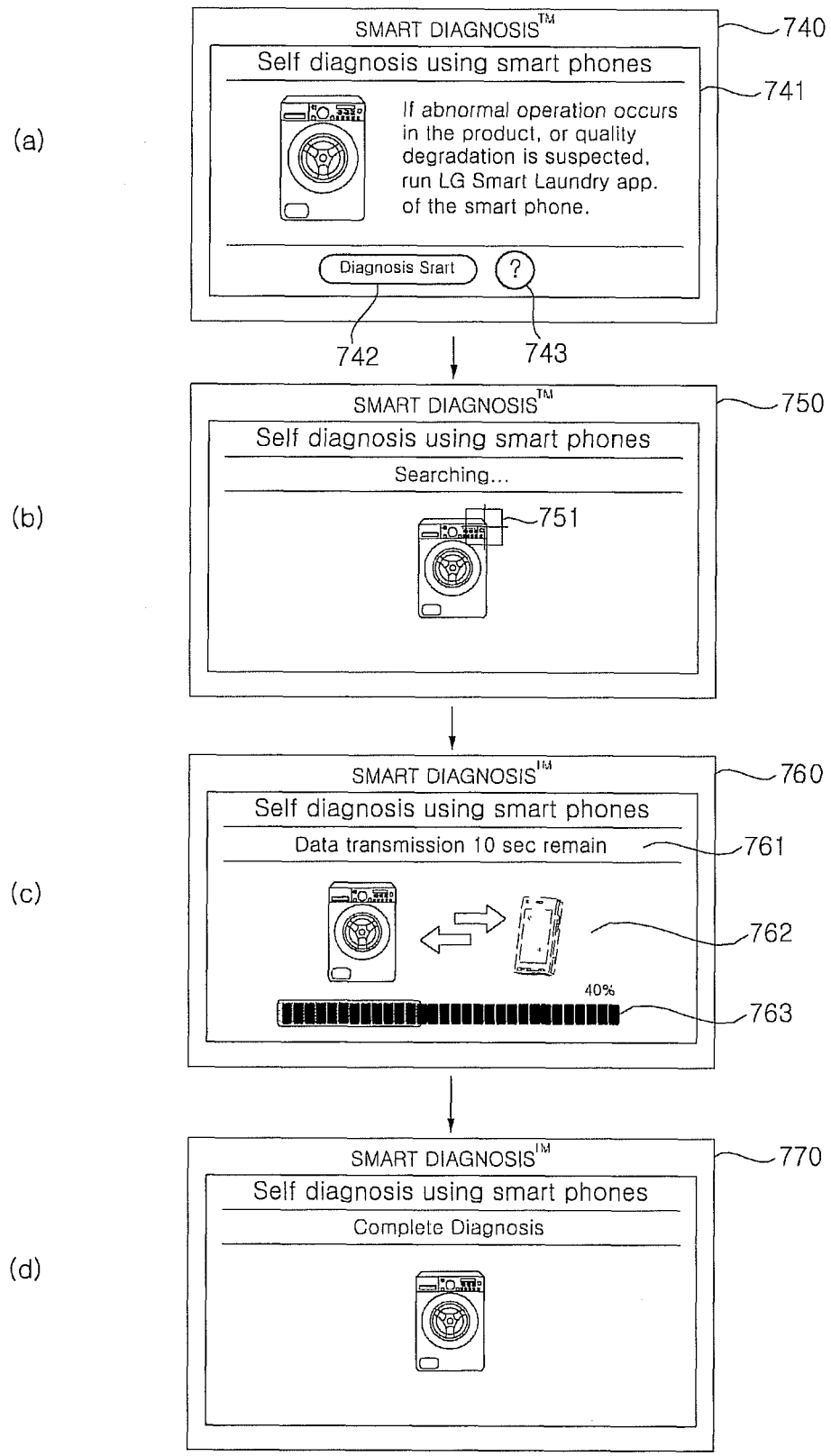

FIG. 8 is a view showing an interface image according to diagnosis of a home appliance using a smartphone.

Referring to FIG. 8(*a*) when diagnosis using a smartphone is selected, a smartphone diagnosis image 740 is displayed on the display unit 118, and a guide 741 about the home appliance diagnosis using hone, a smart diagnosis start button 742, and a help icon 743 are displayed.

When the smart diagnosis start button 742 is selected, as shown in FIG. 8(*b*), the smart diagnosis is started and the position where signal sound including the product information is outputted from the home appliance is displayed on the screen 750.

As shown in FIG. 8(*c*), an image 762 for putting a smartphone to the home appliance is displayed on the screen 760 of the home appliance, and after a predetermined time, the progress state is displayed on the screen 760 of the home appliance while signal sound is outputted. The progress state is displayed by a remaining time 761 and a progress state bar 763.

When outputting of signal sound is finished, as shown in FIG. 8(*d*), a completion image is displayed 770.

Figure 9:
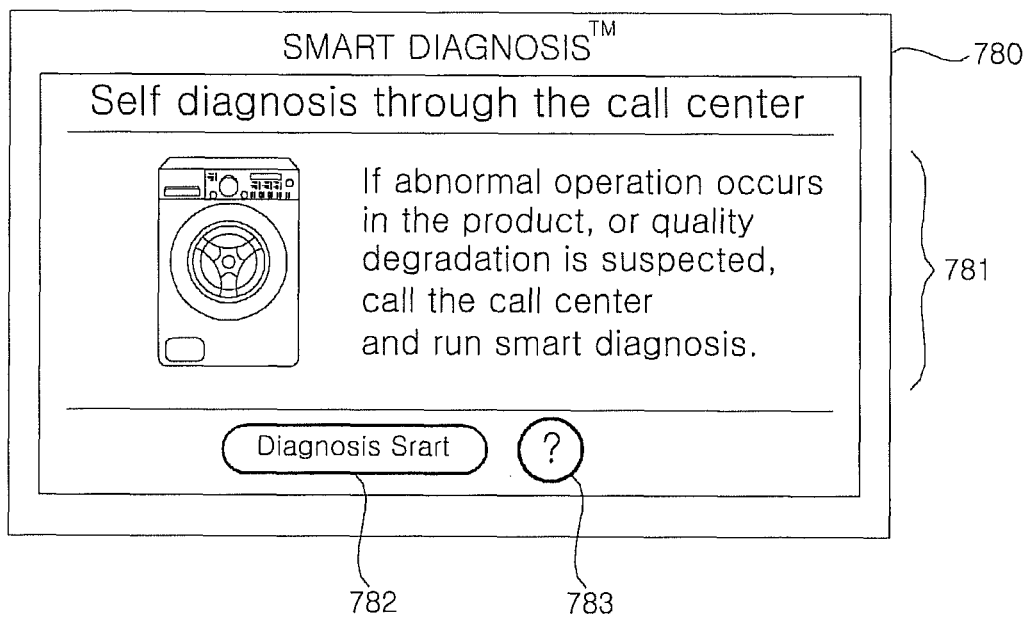

FIG. 9 is a view showing an interface image for home appliance diagnosis using a call center. As shown in FIG. 9, when the diagnosis using a call center is selected, a guide 781 about the home appliance diagnosis using a call center is displayed on the diagnosis image 780 using a call center, and a smart diagnosis start button 782 and a help icon 783 are displayed.

The later image progresses are the same as those described with reference to FIG. 8 when the smart diagnosis start button is selected, and accordingly, the description is not provided.

Figure 10:
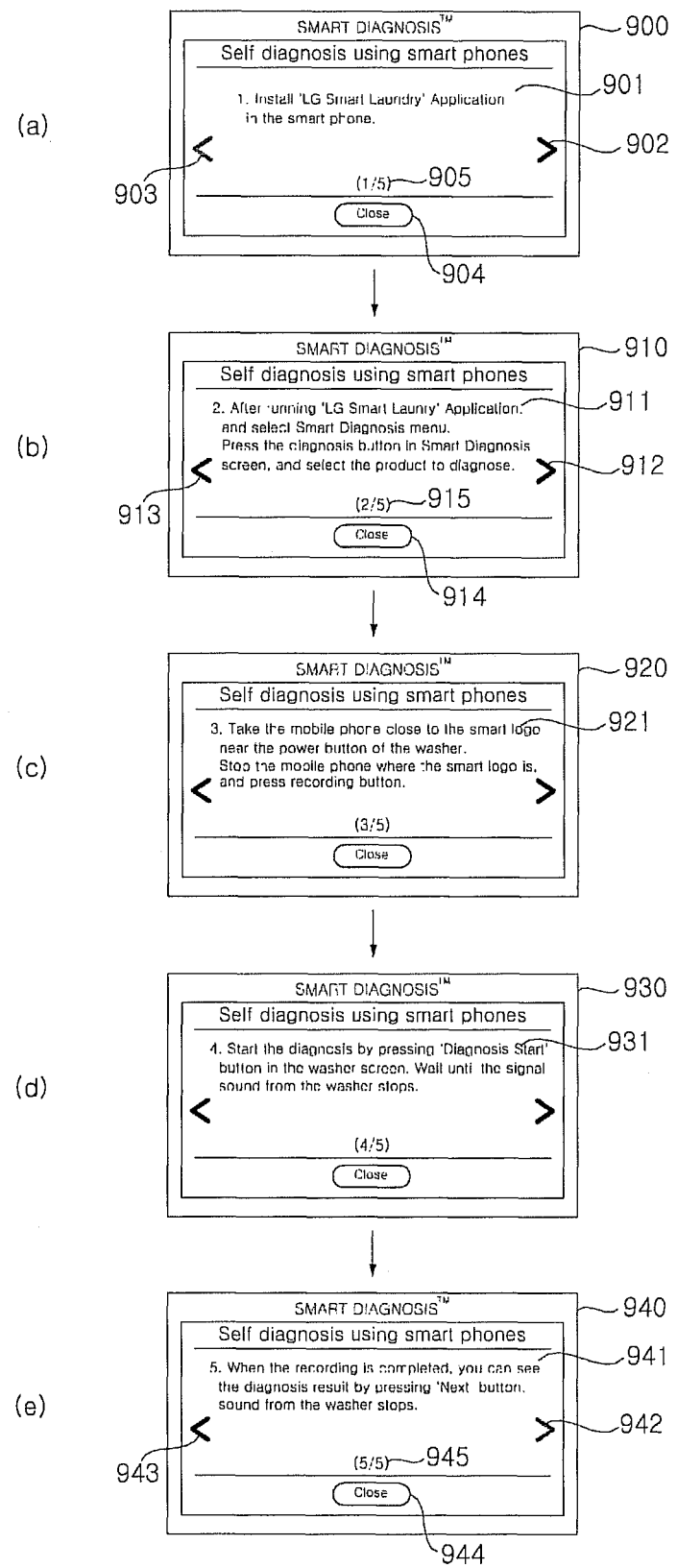
Figure 11:
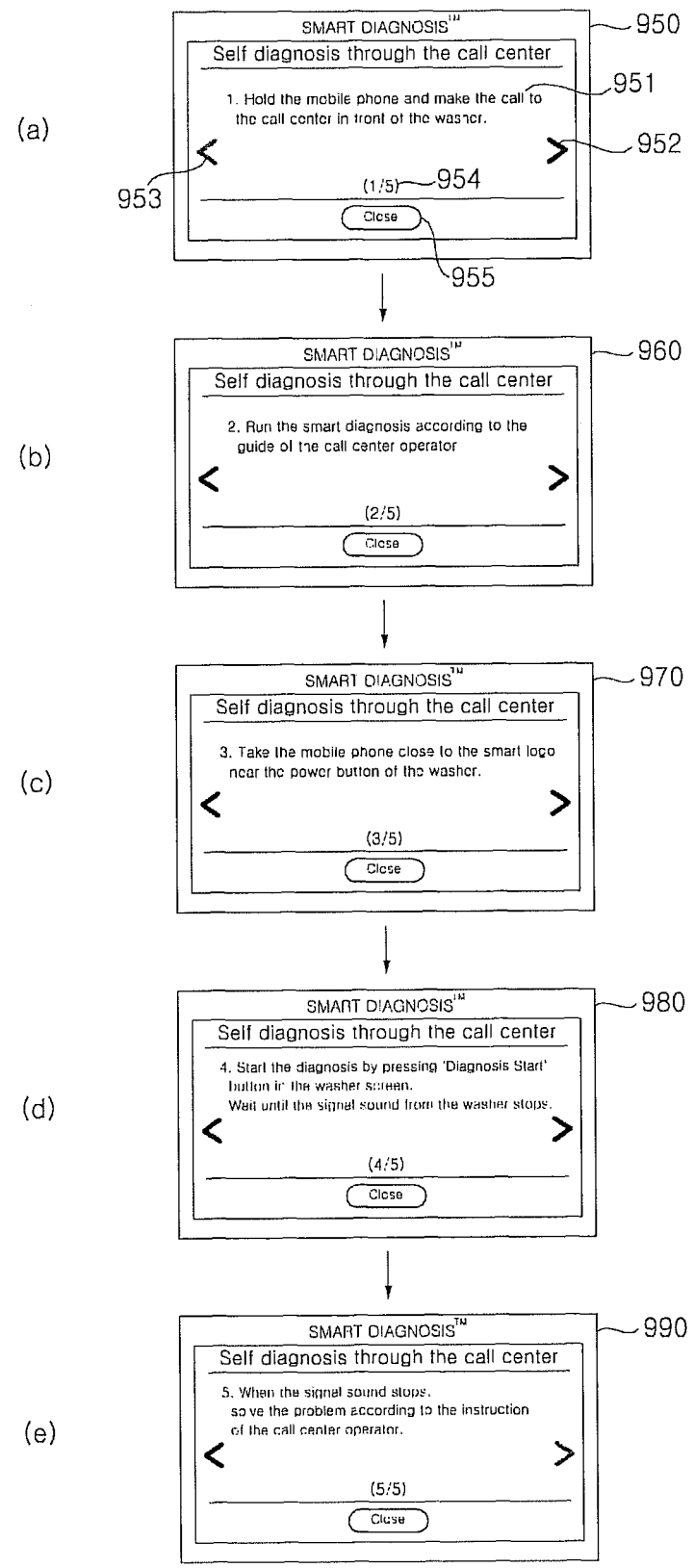

FIGS. 10 and 11 show examples of an interface image on which explanations are outputted, when a help is selected.

When the help is selected in the smartphone diagnosis mode, as shown in FIG. 10(a), it is guided that 901 the diagnosis using a smartphone has been selected on the help image 900, moving buttons 902 and 903 for moving to the previous page or the next page of the explanation are displayed. Further, page information 905 of the explanation and a help end button 914 are displayed. The page information, the end button, and the moving buttons are displayed on all the pages.

When the next image is selected, as shown in FIG. 9(b), selection of a product and selection of the smart diagnosis mode are guided (911). Further, as shown in FIG. 10(c), a guide for moving the smartphone to the display position and pushing the record button of the smartphone (921).

As shown in FIG. 10(d), it is guided to wait for a predetermined time when selecting the smart diagnosis start button (931), and as shown in FIG. 10(e), it is guided to progress the next work after outputting of sound is finished (941).

Meanwhile, as shown in FIGS. 11(a) to 11(e), it is guided that the smart diagnosis using a call center has been selected (951) and it is guided to perform the smart diagnosis in accordance with a guide of a clerk in the call center (960). Further, it is guided to move the phone close to the output position of the home appliance (970), and to press the diagnosis start button, and then a guidance is displayed to follow the guide of the clock in the call center when outputting of sound is finished (990).

Figure 12:
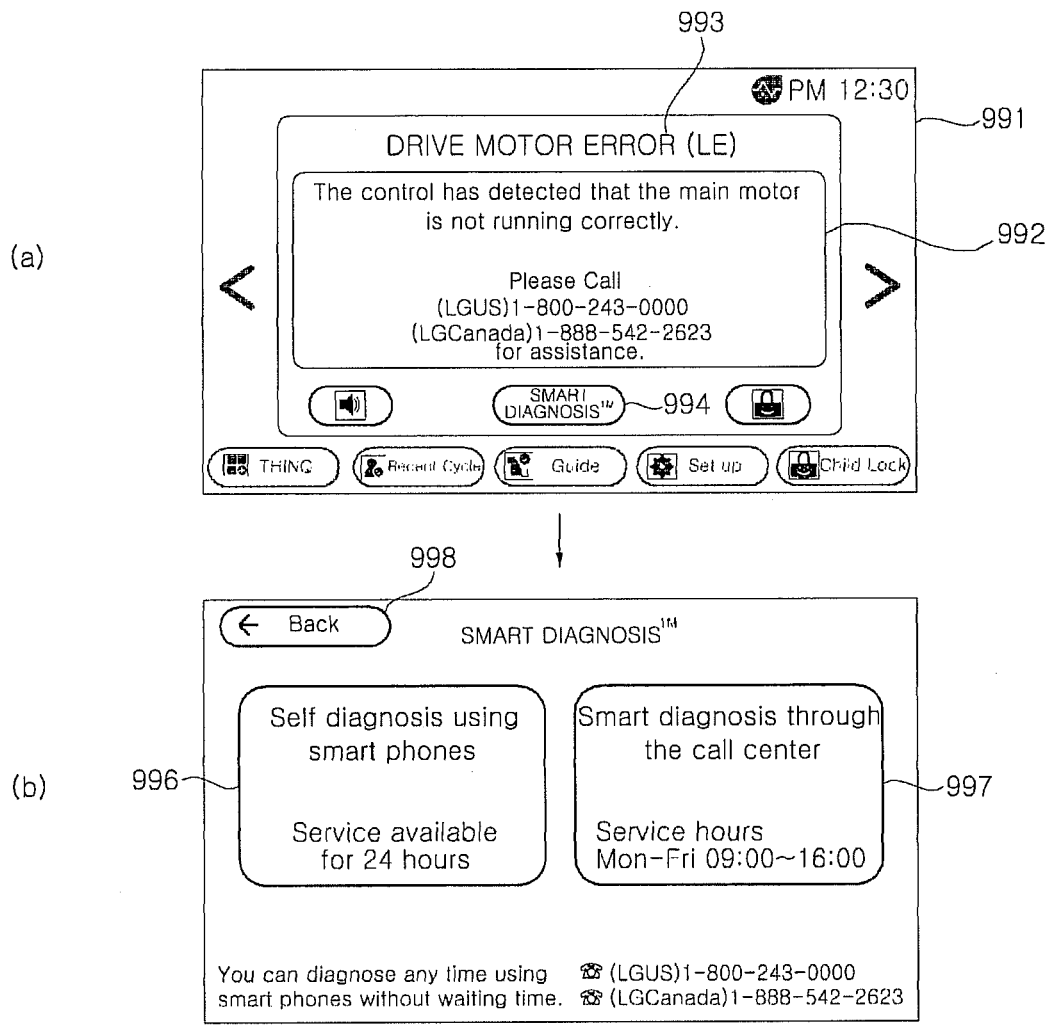

FIG. 12 is an example of an interface image for setting smart diagnosis when an error is generated while a home appliance operates. As shown in FIG. 12, when an error is generated while a home appliance performs a set operation, explanation (922) of the error is displayed with an error code 993 on the screen 991, as shown in FIG. 12(a). Further, a smart diagnosis button 994 is displayed such that a smart diagnosis mode can be set in relation to generation of an error.

When the smart diagnosis button 994 is selected, the operation is stopped, and as shown in FIG. 12(b) selection images for diagnosis 996 using a smartphone and diagnosis 997 using a call center are displayed such that the smart diagnosis method can be selected, and when any one method is selected, as described above, the smart diagnosis mode is set and the product information is outputted by predetermined signal sound, and the home appliance is diagnosed by the smartphone or the service center.

There is provided an appliance, such as a home appliance, comprising: an input unit arranged to receive an order to start smart diagnosis of the status of the appliance and user selection of a diagnosis method for performing the smart diagnosis; a control unit arranged, in response to the input unit receiving the order, to generate a data package comprising data related to the appliance; a sound output unit arranged to receive the data package and output a sound signal representative of the data package; and a display unit arranged to display user information for performing smart diagnosis according to the user-selected diagnosis method and display a progress state of the smart diagnosis.

The data package may comprise data related to the appliance and the current status of the appliance, optionally sensed data. The diagnosis method may comprise: performing the diagnosis locally on an electronic device; or performing the diagnosis remotely over a communications link. The electronic device may be a mobile communications device, optionally a smart phone, arranged to analyze the output sound signal. The electronic device may be further arranged to provide a diagnosis of the status of the appliance, based on the output sound signal, using data stored on the electronic device. The diagnosis method performed remotely over a communications link may be performed using a call center. The call center may comprise a database of diagnosis-related information retrieved from a plurality of users. The data may include data retrieved from a sensor of the appliance.

There is further provided a method for performing smart diagnosis of the status of an appliance, the method comprising: receiving a user input to start smart diagnosis of the status of the appliance; receiving user selection of a diagnosis method for performing the smart diagnosis; generating a data package comprising data related to the appliance; output a sound signal representative of the data package; display a state of the smart diagnosis and user information for performing the smart diagnosis according to the user-selected diagnosis method.

The diagnosis method may comprise receiving the output sound signal on a local electronic device arranged to perform an analysis of the output sound signal and provide output data related to the status of the appliance. The diagnosis method may comprise receiving the output sound signal on a telephone and transmitting the output sound signal to a call center over a communications link, optionally, a telephonic communications link.

It should be understood that the device, method and system in accordance with the present disclosure may be implemented in other detailed ways by those skilled in the art without changing the spirit or necessary features of the present disclosure. Therefore, the embodiments described above are only examples and should not be construed as being limitative in all respects. The scope of the present invention is defined by not the specification, but the following claims, and all of changes and modifications obtained from the meaning and range of claims and equivalent concepts should be construed as being included in the scope of the present disclosure.

What is claimed is:

1. A home appliance, comprising:
an input arranged to receive an order to perform smart diagnosis of a status of the home appliance;
a sound output arranged to output a sound signal having a predetermined frequency;
a display arranged to output a menu and a progress state of the smart diagnosis; and
a controller configured, when an order for performing a diagnosis is input through the input, to set up a smart diagnosis mode, create product information comprising data related to the home appliance, and drive the sound output to convert and output the product information as a sound signal, wherein the controller is configured to perform the smart diagnosis in a plurality of stages by outputting a diagnosis mode setup, a diagnostic device selection, setup of a mode, and help information comprising at least one selected from a group comprising characters, special characters, emoticons, and images, on the display, wherein the controller is further configured to receive user-selection of the diagnostic device to diagnose the home appliance and output user guides in a plurality of stages to perform the diagnosis according to the selected diagnostic device, when the smart diagnosis mode is set up, wherein when the selected diagnostic device is a smartphone, the controller outputs information on an application for smartphone diagnosis and connection information for the application, through the display, and when the diagnostic device is a call center, the controller outputs information on a phone number and service time of the call center through the display, wherein the controller is arranged to output information related to a position of the sound output, and progress procedures and a progress state of the diagnosis, through the display, when the smart diagnosis is started, and wherein the sound signal includes product information input by operation of a selector of the home appliance.

2. The home appliance of claim 1, wherein the data related to the home appliance comprises at least one selected from a group comprising a product ID, configuration, operation information, and error-detecting information of the home appliance.

3. The home appliance of claim 1, wherein when an error occurs during operation, the controller is configured to store error information, output an error code, an explanation of the error, and a smart diagnosis mode selection menu through the display, and immediately perform smart diagnosis when a smart diagnosis mode is selected or the error is generated.

4. A home appliance diagnostic system, comprising:
a home appliance as claimed in claim 1; and
at least one diagnostic device arranged to diagnose the home appliance in response to the sound signal, wherein the at least one diagnostic device includes at least one of:
  a terminal arranged to locally diagnose the status of the home appliance in response to the sound signal output from the home appliance; or
  a service center arranged to remotely diagnose the home appliance in response to the sound signal transmitted from the terminal through a predetermined communication network, wherein the service center comprises a diagnostic server to diagnose the home appliance, wherein the home appliance is configured to receive the user-selection of the diagnostic device between the terminal and the service center to diagnose the home appliance, and output the user guides in the plurality of stages to perform the diagnosis according to the selected diagnostic device, when the smart diagnosis mode is set up, and wherein the home appliance is arranged to output information on an application for smart diagnosis and connection information for the application on a screen when the terminal is selected as the diagnostic device, and output information on a phone number and service time of a call center on the screen when the service center is selected as the diagnostic device.

5. The system of claim 4, wherein the service center is arranged to provide diagnosis data in accordance with a request of the terminal, receive and store the local diagnosis results of the terminal, and perform precise diagnosis on the home appliance in response to the sound signal when the diagnostic device is selected.

6. The home appliance of claim 1, wherein the controller includes an encoder that encodes the product information into a control signal having a predetermined format when the order for performing the diagnosis is received from the input.

7. The home appliance of claim 6, further comprising a memory that stores control data to control operation of the home appliance and the product information.

8. The home appliance of claim 6, further comprising a modulator that controls the sound signal output from the sound output based on the control signal of the encoder.

9. The home appliance of claim 1, wherein the controller includes a main controller that controls operation of the home appliance.

10. The home appliance of claim 3, wherein when the error occurs during the operation, the main controller temporarily stops an operation of the home appliance.

11. A method of operating a home appliance, comprising:
initiating a smart diagnosis mode;
creating product information comprising data related to the home appliance when an order for smart diagnosis of the home appliance is received;
outputting an explanation of an error and an error code and displaying a selection menu whether to perform the smart diagnosis mode on a screen;
receiving user-selection of a diagnostic device to diagnose the home appliance on the basis of the product information;
outputting a diagnosis method comprising user guides in a plurality of stages to perform the diagnosis using the selected diagnostic device;
converting and outputting the product information as a sound signal having a predetermined frequency; and
displaying a progress state of the diagnosis on the screen, wherein the method further includes when the selected diagnostic device is a smartphone, outputting information on an application for smartphone diagnosis and connection information for the application, through the display, and when the diagnostic device is a call center, outputting information on a phone number and service time of the call center, through the display, and outputting information related to a position of the sound output, and progress procedures and a progress state of the diagnosis, through the display, when the smart diagnosis is initiated, and wherein the sound signal includes product information input by operation of a selector of the home appliance.

12. The method of claim 11 wherein the data related to the home appliance comprising at least one selected from a group comprising a product ID, configuration, operation information, and error-detecting information of the home appliance.

13. The method of claim 11, wherein the diagnostic device is any one of a smartphone and a call center.

14. The method of claim 11, further comprising temporarily stopping an operation and storing error information when the error is generated during operation before the smart diagnosis mode is initiated.

15. The method of claim 14, further comprising:
determining whether the operation can be continued, when the smart diagnosis mode is not selected after the error is generated; and
performing again the operation, which is temporarily stopped, when the operation can be continued, and stopping all operations and outputting an error when the operation cannot be performed.

* * * * *